(12) United States Patent
Hildebrandt

(10) Patent No.: US 9,830,206 B2
(45) Date of Patent: Nov. 28, 2017

(54) CROSS-THREAD EXCEPTION HANDLING

(71) Applicant: Cray Inc., Seattle, WA (US)

(72) Inventor: Thomas H. Hildebrandt, Mercer Island, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 14/133,384

(22) Filed: Dec. 18, 2013

(65) Prior Publication Data
US 2015/0169388 A1   Jun. 18, 2015

(51) Int. Cl.
*G06F 9/54* (2006.01)

(52) U.S. Cl.
CPC ........ *G06F 9/542* (2013.01); *G06F 2209/481* (2013.01)

(58) Field of Classification Search
None
See application file for complete search history.

(56) References Cited

U.S. PATENT DOCUMENTS

| | | | | |
|---|---|---|---|---|
| 5,692,193 | A * | 11/1997 | Jagannathan et al. | ........ 718/106 |
| 6,742,123 | B1 * | 5/2004 | Foote | .............. 726/22 |
| 7,194,744 | B2 | 3/2007 | Srivastava et al. | |
| 2003/0154464 | A1 * | 8/2003 | Ullmann et al. | ............ 717/130 |
| 2004/0128489 | A1 * | 7/2004 | Wang | ...... G06F 9/544 712/235 |
| 2005/0034024 | A1 * | 2/2005 | Alverson | ............. G06F 11/362 714/38.11 |
| 2005/0071438 | A1 * | 3/2005 | Liao | ...... G06F 8/4442 709/214 |
| 2005/0240936 | A1 * | 10/2005 | Jones | .................. G06F 8/4442 718/107 |
| 2006/0010431 | A1 * | 1/2006 | Patil et al. | .................... 717/131 |
| 2008/0148259 | A1 * | 6/2008 | Hankins et al. | ............. 718/100 |
| 2010/0169628 | A1 * | 7/2010 | Hinton | ................. G06F 9/3891 712/244 |
| 2014/0237453 | A1 * | 8/2014 | Hulick, Jr. | .................... 717/127 |

OTHER PUBLICATIONS

Cross Thread Exception Raising, 2009, pp. 1-2.*
Manage unhandled exceptions that are thrown on secondary worker threads, 2009, pp. 1-3.*

(Continued)

*Primary Examiner* — Tuan Dao
(74) *Attorney, Agent, or Firm* — Perkins Coie LLP

(57) ABSTRACT

A system for providing cross-exception event handling is provided. The system allows a source thread to throw an event (e.g., exception) as part of structured event handling of a programming language that specifies a target thread. When the event is thrown, the source thread starts a handler thread to handle the event in a current context of the target thread. The handler thread is passed an indication of the event and the target thread and sets its context to be consistent with that of handling events in the target thread. The handler thread then handles the event. The source thread may continue its execution in parallel or may terminate its execution as specified in a statement that threw the event. Execution of the target thread may be aborted and its execution continued at an exit statement of an enclosing structured event handling construct—as specified when the event was thrown.

38 Claims, 4 Drawing Sheets

(56) References Cited

OTHER PUBLICATIONS

Exception Tutorial, 2003, pp. 1-38.*
"Semipredicate problem," Wikipedia [online], [retrieved Jun. 26, 2013], Retrieved from the Internet via the Wayback Machine: URL: https://web.archive.org/web/20130626095633/http://en.wikipedia.org/wiki/Semipredicate_problem, 5 pages.
C# Language, ECMA International, Standard ECMA-334, 4th Edition, Jun. 2006, 553 pages.
Gosling, James et al., The Java Language Specification, Oracle America, Inc., Feb. 28, 2013, 670 pages.
Nakashima, Jun et al., Massivethreads—A Lightweight Thread Library for High Productivity Languages [online], [retrieved Aug. 29, 2013], Retrieved from the Internet via the Wayback Machine: URL: http://web.archive.org/web/20130829201750/https://code.google.com/p/massivethreads, 1 page.
The Qthread Library, Sandia National Laboratories [online], [retrieved Oct. 7, 2013], Retrieved from the Internet via the Wayback Machine: URL: http://web.archive.org/web/20131205053325/http://www.cs.sandia.gov/qthreads, 6 pages.
"Exception handling in threads", question asked by user "user184805" on https://stackoverflow.com, asked Oct. 12, 2009, p. 1-5; retrieved from: "https://stackoverflow.com/questions/1554181/exception-handling-in-threads" on Oct. 4, 2017.
"Catch a thread's exception in the caller thread in Python", question asked by user "Phanto" on https://stackoverflow.com, asked May 13, 2010, p. 1-10; retrieved from: "https://stackoverflow.com/questions/2829329/catch-a-threads-exception-in-the-caller-thread-in-python" on Oct. 4, 2017.
Iliasov, Alexei et al., "Exception Handling in Coordination-based Mobile Environments," School of Computing Science, University of Newcastle upon Tyne, Technical Report Series, CS-TR-878, Nov. 2004, pp. 1-16, University of Newcastle upon Tyne, UK.
Knudsen, J. L., "Fault Tolerance and Exception Handling in BETA", from "Advances in Exception Handling Techniques: Part 1 Language Support for Exception Handling" by Romanovsky, A. et al., Lecture Notes in Computer Science 2022, pp. 1-17, 2001, Springer-Verlag Berlin, Heidelberg 2001.
Zilles, C.B. et al., "The Use of Multithreading for Exception Handling," Micorarchitecture,1999, Micro-32, Proceedings, 32nd Annual International Symposium on Microarchitecture, Lost Alamitos, CA, Nov. 16-18, 1999, IEEE, Haifa Israel, p. 1-11.

* cited by examiner

CROSS-THREAD EXCEPTION HANDLING

BACKGROUND

During execution of a computer program, there may be errors or other conditions (referred to generally as "exceptions") which prevent the function (e.g., method or subroutine) that is currently executing from continuing along its normal execution path. Since the function cannot handle the error, the function communicates the error to its calling function. A simple approach of communicating the error is for the function to return an error code. This approach, however, has a couple of disadvantages. First, it requires the signature of the function to include a parameter for returning the error code. Second, it requires the calling function to parse and respond to the error. If the calling function cannot handle the error, the calling function needs to communicate the error to its calling function. Such communicating of the error up the chain of calling functions requires the signature of each calling function to include a parameter for the error code and requires the calling function to handle the returned error code. This is known as the "semipredicate problem." The expanded signatures and added code can obscure the essential behavior of the functions. In addition, the necessity of altering the signature of a large number of functions due to the addition of explicit error handling creates a significant maintenance problem. Moreover, error-checking code is often added late in the development phase of a computer program which tends to increase the cost of this approach. Along with the signature change, this approach devotes a significant portion of the code to error handling.

Structured exception handling ("SEH") was introduced to help address the semipredicate problem by separating error-handling code from code essential to the behavior of a function. Many programming languages provide a SEH construct, consisting of a try-clause, any number of catch-clauses, and an optional finally-clause. Usually, at least one catch-clause or the finally-clause is present. The SEH construct defines an exception scope ("scope") in that when an exception occurs within that SEH construct, it is handled within that exception scope.

When executing statements within the try-clause of a SEH construct if an exception occurs, then control is transferred immediately to the start of a matching catch-clause within that SEH construct if there is one. If there is a matching catch-clause, the exception is considered "handled" within the exception scope of that SEH construct. Whether or not there is an exception and whether or not a catch-clause executes, the finally-clause if present executes before control exits the SEH construct. If the exception is not handled in the immediately enclosing SEH construct, SEH constructs in enclosing exception scopes are searched for a matching catch-clause. This process continues until a match is found or until there are no more enclosing SEH constructs.

An exception is created explicitly in the code, usually through the execution of a throw-statement. The throw-statement indicates that the program has determined that normal execution cannot proceed. Typically, this occurs when an inconsistency has been encountered and cannot be resolved by the function given the information available to it. The throw-statement indicates the programmer's intention to abort the execution of the currently active try-clause and to resume execution in the most deeply-nested catch-clause that matches that exception. An exception matches a try-clause when the types of the arguments of the exception and the catch-clause are the same.

Within the program code, a SEH construct can be characterized as having a static exception scope. The catch-clauses and the finally-clause within that SEH construct are associated with that exception scope. During execution of that program code, when control enters a SEH construct, a dynamic exception scope is created having the characteristics associated with the static exception scope. The associated catch-clauses are enabled while that exception scope is active. When control reaches the end of that exception scope, the associated catch-clauses are no longer enabled. The exception scopes associated with SEH constructs can be nested, both statically and dynamically.

The process of determining which catch-clause to execute in response to the creation of a given exception involves searching the hierarchy of dynamic exception scopes. In the most deeply nested construct, execution of a throw-statement terminates normal program flow in the enclosing try-block. Control structures are exited and resources reclaimed as specified by the language—typically as if a break-statement had been encountered at every level out to the end of the try-clause. Then the set of catch-clauses associated with that SEH construct are searched for one which matches the exception—using rules specified by the language. If a match is found, then the body of that catch-clause is executed, then the finally-clause is executed. Following that, the exception scope associated with the SEH construct is exited and execution proceeds normally from that point. If no matching catch-clause is found, the finally-clause is still executed. Following that, the exception scope associated with the SEH construct is exited. However, the exception remains active as if it had been thrown immediately after the end of the SEH construct. This causes the next most-deeply nested exception scope associated with a SEH construct to be searched for a matching catch-clause. This process continues until either a matching catch-clause is found or control exits the exception scope in which the executing thread or process was created. The particular programming language typically defines what happens when a thread or process terminates when an exception is still active.

The run-time mechanisms to support structured exception handling use a dynamic registration model or a table-driven model. With the dynamic registration model, exception handlers ("handlers") that are currently active are updated as the exception scopes associated with SEH constructs are entered and exited. With the table-driven model, tables are created that map the ranges of values assumed by the program counter to handlers that are active in that static exception scope. The advantages of the dynamic registration model include a straightforward implementation and separation of implementation from the language. An advantage of the table-driven model is no run-time overhead. However, it can be applied only if the exception-handling constructs are statically scoped. The table-driven model can be viewed as an optimization that is applicable when the associated exception-handling constructs are statically defined. Another advantage of the table-driven model is that it is inherently thread-safe because the program text is assumed to be constant and the underlying execution model is assumed to be thread-safe. In particular, the hardware, kernel software, and language execution model guarantee that the instruction pointer queried for a specific thread will be accurate. Thus, the table-driven model selects the correct set of handlers at any point during the execution of that thread.

With the dynamic registration model, a compiler partitions a SEH construct into a "normal" and an "exceptional" component. The normal component is executed in-line with the normal control flow. The exceptional component is packaged as an exception handler function. The compiler adds code to the normal component to install the exception handler function at a point corresponding to entry to the try-block and to uninstall the handler at a point corresponding to the start of the finally-block.

The mechanism for implementing exceptions can be represented by a Scope object which is created when a SEH construct is entered and destroyed when that block is exited. This mechanism can be illustrated by the pseudo code in C++ syntax of Tables 1-5. The Scope class is illustrated in Table 1.

TABLE 1

```
class Scope
{
  public:
    typedef void (*handler_t)(Scope&, object&);
  private:
    handler_t handler;
  public:
    Scope(handler_t hdlr) : handler(hdlr) { }
    void handle(object& o)
    {
      (*handler)(this, o);
    }
};
```

The example code of Table 2 can be used to illustrate the mechanism of the Scope class.

TABLE 2

```
try
    stmt_try;
catch (T1& t1)
    stmt_c1;
catch (T2& t2)
    stmt_c2;
catch ( ... )
    stmt_any;
finally
    stmt_fin;
```

For this example code, a compiler would generate an "exceptional" component as illustrated in Table 3.

TABLE 3

```
void handler(Scope& scope, object& o)
{
  if (can_dispatch<T1>(o))
    stmt_c1;
  else if (can_dispatch <T2 > (o))
    stmt_c2;
  else
    stmt_any;
  goto resume;
}
```

The compiler would generate a "normal" component as illustrated in Table 4.

TABLE 4

```
try:
    Scope* scope = new Scope(handler);
    stmt_try;
resume:
    stmt_fin;
    delete scope;
```

The compiler would generate the code for the throw-stmt with the argument expr as illustrated by Table 5.

TABLE 5

```
scope->handle(expr);
```

As shown in Table 4, this mechanism would result in the scope object of the Scope class being instantiated when the try-clause is entered. The constructor of the scope object is passed a reference to the handler function of the exceptional component of Table 3. The try-statement would then be executed. As shown in Table 5, to throw an exception, the try-statement would invoke the handle method of the scope object passing an exception argument indicating the type of the exception. The handle method would then invoke the handler function (passed when the scope object was instantiated) passing a reference to the scope object and the exception argument. As illustrated in Table 3, the handler function determines whether the exception matches any of the catch-clauses. Since the example code includes a catch-clause with an ellipsis, the last catch-clause will match any exception. The handler function executes the catch-statement of the matching catch-clause. The handler function then continues execution at the resume label of Table 4 to execute the finally-statement and destroy the scope object. (Note: The "goto" statement from within a function to outside the function may not be supported by the programming language but is used to illustrate where execution continues irrespective of the mechanism actually employed.)

The example codes of Tables 1-5 do not address the situation when the exception does not match a catch-clause. FIG. 1 illustrates example data structures for tracking exception scopes for use in locating matching catch-clauses. The data structures 100 for each thread include a machine state 110, an execution stack 120, exception scope stacks 130, and handlers 140. The machine state stores the current state of the thread and includes an instruction pointer ("IP") 111 and a frame pointer ("FP") 112. The frame pointer points to the top activation frame 123 of the execution stack for the thread. When a function is called during execution of the thread, a new activation frame is added to the execution stack. The activation frames stores the variables defined to be within the scope of the called function. When a function returns to its calling function, the activation frame of the function is removed from the top of the execution stack and the frame pointer is adjusted to point to the activation frame of the calling function. For example, when the function associated with activation frame 123 returns, activation frame 123 is removed from the execution stack and the frame pointer is set to point to activation frame 122. The instruction pointer would also be adjusted to point to the instruction in the calling function after the instruction that resulted in the call to the function.

Each activation frame points to one of the exception scope stacks 130. Each exception scope stack includes an exception scope (or just "scope") for each active SEH construct within the function. For example, activation frame 123 points to exception scope stack 130C, which contains scopes 137, 138, and 139 for the three active scopes of the function. When a SEH construct is entered, a new scope is added to the top of the exception scope stack; and when a SEH construct is exited, the scope is removed from the top of the exception scope stack. For example, if scope 138 was currently at the top of the exception stack and a SEH construct was entered, then scope 139 is added to the top of the exception scope stack 130C. When an exception occurs, the scope at the top of the exception scope stack is identified and its handler is invoked. If the handler handles the exception, the scope at the top of the stack is removed and execution continues at the finally-block, if any. If not handled, the scope is also removed from the top of the stack and the process is repeated for the next scope on the exception scope stack for the function. When the last scope of an exception scope stack is removed without finding a handler that handles the exception, then the activation frame at the top of the execution stack is removed and the function effectively returns to the calling function by checking to see if the exception can be handled by any handlers of the calling function. If the exception is not handled by any handers of any of the activation frames, then the final disposition of the exception is defined by the language.

With some languages, a terminate function is called when the exception is not handled. The terminate function would normally terminate the thread. However, a terminate handler can be installed on a thread-by-thread basis to effectively allow the program to decide how to handle the exception. With other languages, an uncaught exception handler for the thread is called. If the thread does not have an uncaught exception handler, then an uncaught exception method of a parent thread is invoked. These languages confine exception handling to a given thread or its ancestor threads.

DETAILED DESCRIPTION OF THE PREFERRED EMBODIMENT

Figure 1:
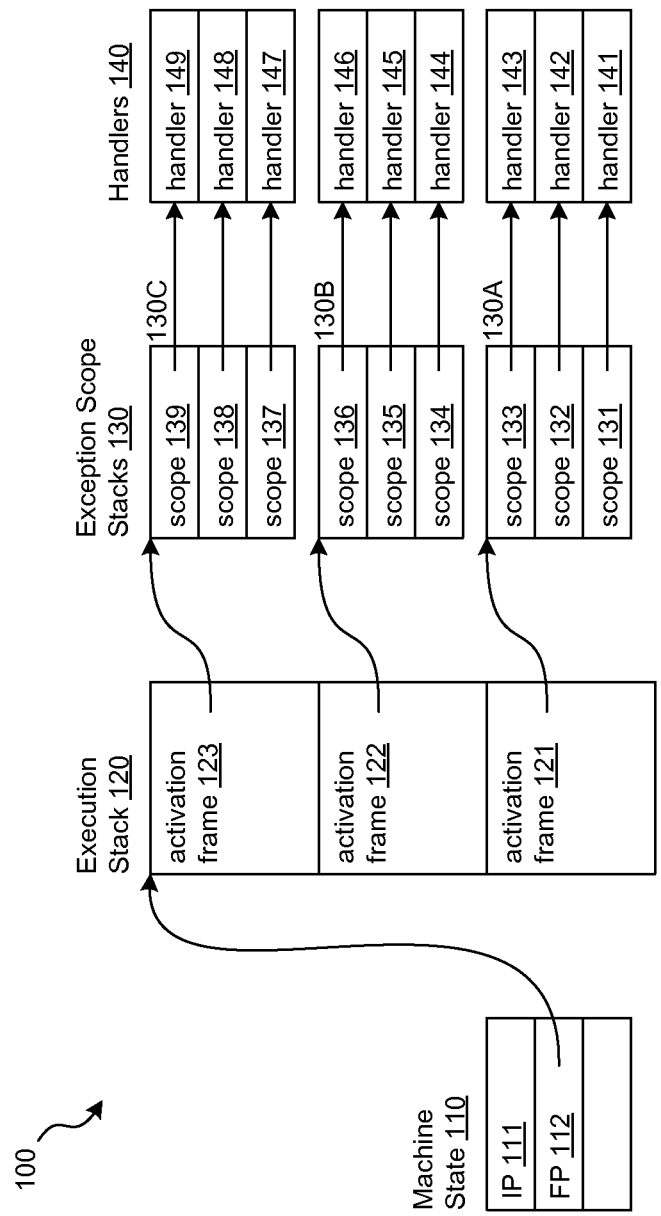
FIG. 1 illustrates example data structures for tracking exception scopes for use in locating matching catch-clauses.

A method and system for handling exceptions in a multithreaded environment is provided. In some embodiments, a cross-thread exception handling ("CTEH") system provides capabilities for 1) handling an exception in parallel (asynchronously) with the thread of execution that generated the exception;
2) terminating the thread that generated the exception or continuing its execution at the point where the exception is created;
3) specifying the thread in whose context the exception should be handled;
4) aborting or continuing execution of the thread in whose context the exception should be handled; and
5) specifying that the exception should be handled synchronously within the same thread of execution.

These capabilities provide a programming model that is especially useful for handling exception conditions in multithreaded applications. The programming model allows an exception to be handled by a target thread or a handler thread that is distinct from the source thread that gives rise to the exception.

In some embodiments, the CTEH system allows a source thread executing a structured exception handling construct of a programming language to create an exception that specifies a target thread based on an exception creation statement of the programming language and starts a handler thread to handle the exception in a current exception context of the target thread. The exception context refers to the state (e.g., values of variables and the exception scopes) of the target thread in which an exception occurring in the target thread would be handled. The handler thread sets its context to be consistent with the handling of the exception within the target thread. For example, the handler thread may set its pointer to its exception scope stack to point to the exception scope stack of the target thread. The handler thread may also copy activation frames of the target thread that are associated with an exception scope of the exception scope stack for use by the handler thread. For example, an activation frame from the execution stack of the target thread may be copied to the top of the execution stack of the handler thread. The handler thread then handles the exception. The target thread and the source thread can then continue their processing as described below.

In some embodiments, the CTEH system may compile a multithreaded program to support cross-thread structured exception handling by identifying a structured exception handling construct that includes a throw-block (or more generally an exception creation statement) for creating an exception within a source thread, identifying a target thread to handle the exception, and then generating throw code for the throw-block. The throw code identifies a handler thread to handle the exception and causes the handler thread to handle the exception in the context of a target thread. The compiler may generate code to initialize a per-thread exception scope stack that is accessible through a thread descriptor. When the compiler identifies a structured exception handling construct that includes a catch block with a catch exception declaration and a catch statement, it generates catch code of an exception handler for the catch block. The generated catch code executes the catch statement when an exception matches the catch exception declaration. The compiler also generates entry code to push onto the exception scope stack an exception scope that identifies the exception handler. The entry code is executed upon entry into the structured exception handling construct.

To support the capabilities 1-4 mentioned above, the CTEH system extends the current programming model of SEH constructs. One extension allows an exception generated in a source thread to be handled in the context of another "target" thread (i.e., cross-thread exception handling). The programming model expands the description of exception creation (i.e., the throw statement) to include the designation of the thread that is expected to handle that exception. To support cross-thread exception handling, the CTEH system implements a per-thread exception scope stack as a property of (or associated with) a thread rather than as a property of the currently executing function of that thread. The CTEH system also makes the exception scope stack directly reachable from the thread descriptor so that the context (also referred to as "exception context") used to handle an exception can be changed from that of the source thread to that of the target thread. Another extension allows execution of the code which generates the exception in the source thread to proceed at its own discretion immediately after the exception creation statement. Another extension allows the source thread to terminate after execution of the exception creation statement. Another extension allows the current execution of the target thread to be aborted and to be continued after the exception is handled at an exit statement of the SEH construct in which the exception was handled. To support these extensions, the CTEH system expands the description of exception creation to include three different types: a self-terminating type (die), a target-aborting type (kill), and a type (post) that is neither self-terminating nor target-aborting. Table 6 illustrates a typical exception creation syntax.

TABLE 6 exception-creation-statement:
  throw ;
  throw expression ;

The throw statement is self-aborting (i.e., continues execution at a location other than immediately after the throw statement) and runs in the current thread. The version that does not contain an expression is permitted only within a catch-block to re-throw the exception currently being handled.

Table 7 illustrates the exception creation syntax of the CTEH system. The CTEH system introduces die and die expression forms of the throw statement, which causes the source thread to terminate after the exception is handled. The kill and kill expression forms are equivalent to the existing throw and throw expression forms in terms of the observable semantics and in particular aborting execution where the exception was created. The post and post expression forms are similar to the die forms except execution continues where the exception was created (e.g., immediately after the post statement). The other forms support cross-thread exception handling by specifying the target thread that is to handle the exception. In some embodiments, the exception creation statement may use a variable, rather than a reserved word, to specify the type of the statement, thus deferring until runtime whether the die, kill, or post type is being used. For example, the form of such a statement may be throw type; where type is a variable that can be set to values representing the three different types of throwing an exception.

TABLE 7 exception-creation-statement:
  die ;
  die expression ;
  die thread-id , ;
  die thread-id, expression ;
  kill ;
  kill expression ;
  kill thread-id , ;
  kill thread-id, expression ;
  post ;
  post expression ;
  post thread-id, ;
  post thread-id , expression ;

1 Language Elements

An example syntax for the SEH construct and exception creation statements of the CTEH system is provided.

1.1 the Structured Exception Handling Construct

The SEH construct of the CTEH system has the same representation as in current programming languages: a try-clause followed by zero or more catch-clauses, followed by an optional finally-clause as illustrated by Table 8.

TABLE 8 exception-handler-statement:
  try-clause catch-clause-seq$_{opt}$ finally-clause$_{opt}$
  catch-clause-seq:
    catch-clause
    catch-clause-seq catch-clause
  try-clause:

TABLE 8-continued try statement
  catch-clause:
    catch ( exception-declaration ) statement
  exception-declaration:
    formal-declaration
  finally-clause:
    finally statement 1.1.1 Serial Semantics The semantics traditionally associated with this construct assume a serial execution environment. In a serial execution environment, there are two ways in which execution can proceed depending on whether any statement in the try-block causes an exception to be thrown. In the first case (no exceptions) when control enters an exception-handler-statement, the statement in the try-clause is executed. Then, if there is a finally-clause, the statement in that clause is executed. Then, execution continues with the statement following the exception-handler-statement.

In the second case (an exception), execution of the statement in the try-clause causes an exception to be thrown. When that occurs, execution of the current statement is aborted, the execution stack is unwound and resources are reclaimed according to language rules, until the execution stack is at the same depth as it was immediately after entering the exception-handler-statement and before executing the first statement in the try-clause. Then, the list of catch-clauses is searched for one which matches the thrown exception. Typically, an exception is an object with a run-time type. The type of the exception is compared to the type of the exception-declaration in each catch-clause in turn, using the language's normal argument-binding rules. If the exception can bind to a given exception-declaration, then that constitutes a match and the statement in the corresponding catch-clause is executed. The exception-declaration containing only ellipsis ( . . . ) will bind to an exception of any type.

After the catch-clause has been executed, the exception is considered handled. Execution continues with the statement in the finally-clause if there is one. Otherwise, the exception-handler-statement is exited, and execution continues with the statement immediately following it.

If there is no matching catch-clause within the exception-handler-statement, then the exception remains unhandled. In that case, the statement in the finally-clause is executed but execution does not continue normally with the statement following the exception-handler-statement. Instead, the search for a matching handler continues in the scope outside of the current exception-handler-statement, as if the exception had been thrown at a point just beyond the end of that exception-handler-statement.

If the exception remains unhandled after the last scope is exited, then the execution stack will have been unwound completely and thread on which it was created will terminate. By creating an exception-handling-statement shortly after the thread begins execution, the programmer can implement any desired behavior to handle that case.

1.1.2 Parallel Semantics

Serial execution allows the programmer to assume that the cause of an exception was the execution of code within the try-clause. In a parallel execution environment, the exception (i.e., an external exception) could also come from another thread, the source thread. When a source thread creates an exception, the source thread can either be terminated or continue its execution immediately after the exception creation statement. The target thread can continue normally because the CTEH system executes the statement in a matching catch-clause of the target thread on a handler thread that is distinct from the target thread. The target thread can alternatively be suspended and have its execution aborted to continue, after the handler thread handles the exception, at the exit statement of the SEH construct in which the exception was handled. Aside from the synchronization required to maintain the integrity of the exception scope stack, the CTEH does not need to perform synchronization between the source thread and the target thread. Rather, if synchronization is needed, it is performed through data shared between the handler thread and the target thread.

Typically, a function which expects to respond to exceptions arriving from other threads will create a variable to store state information. This variable is initialized before entering an exception-handler-statement. Statements within the catch-clauses can access and update this variable to indicate to the running process that an external exception has been caught. The statement in the try-clause might contain a loop that continuously polls that variable and responds to asynchronous exceptions when they occur. Alternatively, the statement in the finally-clause or in the code following the exception-handler-statement can examine that variable and take application-defined actions. The finally-clause is executed on the target thread, not in the handler thread.

1.2 Exception Creation Statements

As illustrated in Table 7, the CTEH system introduces the keywords die, kill, and post for use depending on whether the exception should be self-terminating, target-aborting, or neither, respectively. The CTEH system handles a cross-thread exception asynchronously in that the exception is handled in parallel in a handler thread while the source thread either continues its execution or is terminated. It is possible to reuse the source thread that is terminated as a result of a die form of an exception as the handler thread. Similarly, it is possible to reuse the target thread that is suspended as a result of a kill form of an exception as the handler thread. In such cases, it is implementation-dependent whether the source or target thread is reallocated as the handler thread or a new thread is allocated (e.g., created) for use as the handler thread.

For a non-terminating exception, in the case that the target thread is not specified (or is the same as the source thread), the CTEH system may reuse the source thread as the handler thread. To do so, the CTEH system suspends execution of the source thread until execution of the handler thread is complete. At that point, execution can resume with the statement following the post or kill statement that created the non-terminating exception. This reuse is possible when there are no data dependencies that would cause the exception handler code to wait for the source thread to update some shared data. To support such reuse, execution of the handler and the code following the post or kill statement should be serializable, with the handler being executed first.

When the target thread is specified, the CTEH system runs the handler for the exception in the context of the target thread. If a target thread is not specified, then the CTEH system handles the exception in the context of the source thread. Even if the source thread is reused when a target thread is specified, the handler thread and the target thread are normally distinct. In some embodiments, the exception may be handled by the target thread, rather than a separate handler thread.

The CTEH system also provides for the case that an exception has been caught anonymously (as by the catch ( . . . ) syntax), but the matching catch-clause is unable to handle it. To support that use case, there are six forms of exception creation statement (two each for die, kill, and post) that do not take an expression argument. These statements may only appear within a catch-clause. Their meaning is to cause the exception being handled to be re-thrown. When the die keyword is used, the re-throw is fatal causing the CTEH system to abort execution of the catch handling and search for a matching catch-clause for the re-thrown exception. When the kill or post keyword is used, a new thread is created to handle the re-thrown exception, while execution of the currently executing handler is completed (asynchronously). In the forms containing a thread-id, the re-thrown exception is handled (asynchronously) in the context of the target thread.

1.3 Translation of the Language Elements

In the some embodiments, the CTEH system (e.g., a CTEH compiler) translates a SEH construct into executable form is the same as in existing implementations. However, the translation of the exception creation elements differs because the code produced generally arranges for the exception to be handled in a thread distinct from the source thread. The CTEH system produces code that also provides the expected semantics for non-terminating as well as terminating exceptions. The most general form of the non-terminating exception creation statement post thread-id, expression;. The CTEH system translates the statement into executable code as shown in Table 9.

TABLE 9

```
void post (thread_id_t tid, const object& exception)
{
    thread_new(handle_exception(tid, exception));
}
```

The variable tid binds to the specified thread-id (i.e., the target thread) and exception to the specified expression. This function creates a new thread to run the handler. The function handle_exception dispatches the exception in the context of the target thread. The form post expression; is equivalent to post current, expression; in which current is the thread-id of the source thread.

The translation for the most general form of the terminating exception creation statement is die thread-id, expression;. The CTEH system translates the statement into executable code as shown in Table 10.

TABLE 10

```
void die(thread_id_t tid, const object& exception)
{
    thread_new(handle_exception(tid, exception));
    thread_unwind_terminate( );
}
```

This translation is the same for the most general form of post except that the function thread_unwind_terminate( ) is called after creating the handler thread to unwind the execution stack of the source thread, executing the finally-clauses associated with active try-blocks encountered along the way. The execution stack for the source thread will be unwound completely and then the thread will terminate. In contrast to the throw statement, execution never resumes at any point in the code associated with the source thread.

In some embodiments, the CTEH system neither generates an error nor posts an OS-level signal when a thread is terminated in this way. If the application or language implementation wishes to capture terminating exceptions, the appropriate handler can be installed when the thread is initialized, and the CTEH system can be used to handle otherwise unhandled exceptions.

The most general form of the target-aborting exception creation statement is kill thread-id, expression;. The CTEH system translates the statement into executable code as shown in Table 11.

TABLE 11

```
void kill(thread_id tid, const object& exception)
{
   handle_aborting_exception(tid, exception);
   thread_unwind_resume(tid, exception);
}
```

The variable tid binds to the specified thread-id (i.e., the target thread) and exception to the specified expression. This function optionally allocates a new thread to run the handler. The function handle_aborting_exception aborts execution of the target thread and then dispatches the exception in the context of the target thread as of the point where the target thread was aborted. The function thread_unwind_resume unwinds the exception and execution stacks of the target thread to the state that existed just prior to entering the SEH construct that contains the catch-clause matching the given exception. The finally-clause associated with each SEH construct that is exited is executed as that execution scope is exited. Execution then continues from the point in code following that SEH construct. The form kill expression; is equivalent to kill current, expression; in which current is the thread-id of the source thread. When no target thread is specified, the semantics of the kill statement are the same as for the throw statement.

When the exception creation statement is of the form kill expression; with no target thread specified, execution of the source thread continues at a point following the finally-clause associated with the try-block with which the matching catch-clause is also associated. The CTEH system unwinds the execution stack of the source thread only to the point at which the label for the point of continuation would be in context. The CTEH system could handle the exception in a handler thread in the context of the source thread. The CTEH system could suspend the source thread while the handler thread performs that unwinding and causes the resumption of the source thread and then terminates. Alternatively, the CTEH system could use the source thread for handling the exception and adjusting the execution stack. In the simplest case, a matching catch-clause for the active exception is found and the catch statement executes. After that, the CTEH system returns control to this kill function and then calls the thread_unwind_resume function. The thread_unwind_resume function unwinds the execution stack and executes the finally-clauses associated with active try-blocks that are encountered along the way—just as in the thread_unwind_terminate function. In contrast, however, the unwinding stops after the finally-clause in the SEH construct containing the matching catch-clause is executed. The CTEH system then resumes execution with the statement following the try-block. In the case that no matching catch-clause is found in the entire exception scope stack, the thread_unwind_resume function unwinds the execution stack completely and that thread terminates. In either case, control never returns from the call to thread_unwind_resume function.

1.4 the Exception Scope Stack

In some embodiments, the CTEH system uses a single exception scope stack to support exception handling, rather than a separate exception scope stack for each activation frame as used by the dynamic registration model. The single exception scope stack has a scope for every active try-clause (i.e., entered but not exited). The CTEH system stores a pointer to the exception scope stack ("ESS pointer") in the thread descriptor so that the ESS pointer can be readily accessed by another thread without knowledge of the current state of the target thread. Alternatively, the CTEH system could access the ESS pointer through the current frame pointer of the target thread. If the target thread is suspended, the ESS pointer could be obtained from the machine state that is stored in the thread descriptor. If the target thread is running, however, the machine state is not readily available and the target thread would need to be suspended to access the current frame pointer.

Figure 2:
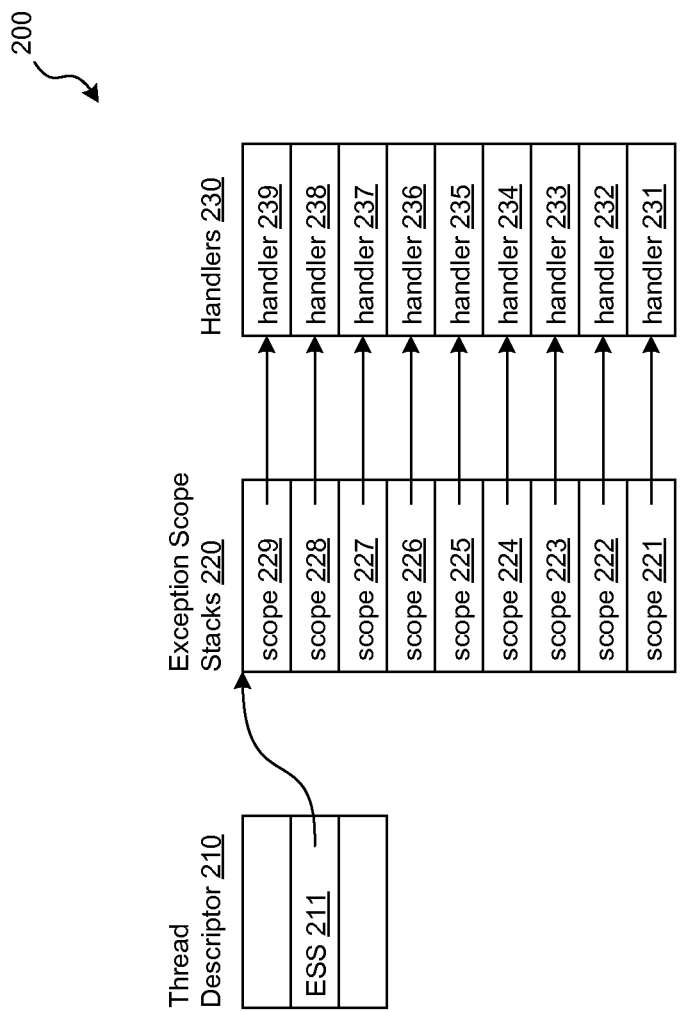
FIG. 2 illustrates example data structures for tracking exception scopes for cross-thread exception handling.

FIG. 2 illustrates example data structures for tracking exception scopes for cross-thread exception handling. Data structures 200 include a thread descriptor 210, exception scope stack 220, and handlers 230. The thread descriptor includes an ESS pointer 211, which points to the top of the exception scope stack. The exception scope stack includes scopes 221-229, which point to their corresponding handlers 231-239.

1.5 Run-Time Behavior 1.5.1 Maintenance of the Exception Scope Stack

With the CTEH system, each thread maintains its own exception scope stack independently of any other thread. When a new thread is executed, the CTEH system creates an exception scope stack that is empty and stores its ESS pointer in the thread descriptor. When execution reaches a point just before entering a try-block, the CTEH system will execute code that creates a scope pointing to the handler associated with that SEH construct and pushes the scope onto the top of the exception scope stack. As illustrated in FIG. 2, if the exception scope stack was empty, then just before entering a try-block, the CTEH system would push scope 221 onto the exception scope stack.

If nested SEH constructs are entered while execution proceeds inside this try-block, the CTEH system will create another scope and push it onto the exception scope stack. As illustrated in FIG. 2, if scope 228 was currently at the top of the exception scope stack, then scope 229 would be pushed onto the top of the stack before a try-block is entered. Similarly, if the code within the top-level try-block calls a function and execution of that function enters a try-block, the CTEH system creates a new scope and pushes it onto the exception scope stack. The contents of the exception stack reflects all of the exception handling scopes that are active at any given point in the execution of the current thread. When the scope associated with a given try-block is exited, the CTEH system removes the top scope from the exception scope stack.

When recursive calls to functions containing SEH constructs are made, the exception scope stack can become quite deep. If a given exception is to be handled, it will either be handled by the most deeply nested of these repetitively stacked scopes or not at all. In some embodiments, the CTEH system can replace these repeatedly stacked scopes with a single scope and a count of the repetitions.

1.5.2 Exception Dispatch

In some embodiments, when an exception is created, the CTEH system evaluates the expressions in the exception creation statement representing the target thread_id (if present) and the exception itself (if present). The CTEH system creates a new thread and passes both as arguments (or their respective default values) to the handle_exception function. The handle_exception function retrieves the thread descriptor for the target thread and then retrieves the ESS pointer from the thread descriptor. The CTEH system then dispatches the exception by retrieving the address of the associated compiler-generated handler referenced by the scope at the top of the stack pointed to by the ESS pointer and invoking the handler passing an exception object.

The body of the compiler-generated handler for a SEH construct consists of a series of type predicates—one for each of the catch-clauses in the source code. (See, Table 3.) The handler tries each of these in turn for a match with the dynamic type of the exception object. If a match is found, the body of the corresponding catch-clause is executed and then the handler returns true, indicating that the exception was handled. If none of the type predicates matches the type of the exception object, the handler returns false, indicating that the exception was not handled.

Upon return from the handler, the handle_exception function checks the return value. If true, then handle_exception function returns immediately, indicating success. Since the handle_exception function is the top-level routine on the handler thread, that thread has completed successfully, and therefore terminates. If the return value from the handler was false, the exception was not handled in the current scope and the handle_exception function finds the next deeper element in the exception scope stack, and executes its associated handler. This process continues until either a handler returns true or until the exception scope stack is empty. If empty, the handle_exception function returns to its caller which causes the handler thread to terminate.

The unwinding functions thread_unwind_terminate( ) and thread_unwind_resume( ) operate as described above except how execution is resumed. The CTEH system could use setjmp and longjmp to restore the execution stack to a state that existed at an earlier point in execution of the target thread since the thread_unwind_resume function will only be called when execution of the target thread is aborted. Alternatively, the CTEH system uses a direct manipulation of the thread descriptor to effect resumption at the desired code address. At the point that the thread_unwind_resume function has unwound the execution stack to the point that it agrees with the context immediately containing the scope associated with the SEH construct that contains the matching catch-clause, the execution stack will be in a state that allows execution to continue from a point following the end of the SEH construct. The CTEH system then starts a utility thread and suspends the current thread. The utility thread replaces the return address in the thread descriptor for the suspended thread with the address at which execution is to continue. The utility thread then wakes the suspended thread and terminates. In this way, the original thread can continue at the desired code location, just past the end of the SEH construct.

1.5.3 Stack Adjustment

A goal of the CTEH system is to have the code of a matching catch-clause run in the context of the target thread. To achieve this goal, the variables accessible to the code of a catch-clause are those that are accessible (according to the rules of the language) at a point just before entry into the SEH construct plus any declared locally within the catch-clause. The variables declared within the scope of the SEH construct's try-block are not accessible because the exception could have occurred before any such variable had been properly initialized. Since global and filescope-static variables are accessible to all the code in a process, variables with these storage classes are available already. As to the variables on the execution stack, the CTEH system makes these accessible according to the scoping rules of the language. In statically scoped languages (such as C and C++), the only stack-based variables accessible within a given function are those within the activation frame associated with the function itself. In dynamically scoped languages (such as Java), the entire execution stack may be searched to find an accessible variable.

With a statically scoped language, the CTEH system may copy the variables accessible to the catch-clause into the activation frame associated with the running handler. With a dynamically scoped language, the CTEH may "split" the stack by linking the activation frame being used by the handler into the execution stack of the target thread. Since the "split" stack works for both dynamically and statically scoped languages, the CTEH system may be implemented to use a "split stack." To implement a split stack, prior to entering the body of a catch-clause, the CTEH system adjusts the execution environment so that it appears to the code in the catch-clause as if control had transferred directly to the start of the catch-clause from the start of the enclosing SEH construct. The CTEH system simulates this appearance by creating a copy of the entire activation frame for the function containing that SEH construct from the execution stack of the target thread into the execution stack of the handler thread. The CTEH system sets the frame pointer to the handler's activation frame to point to the activation frame for the calling function's activation frame in the target thread's execution stack. This gives the target thread's execution stack a "Y" shape—hence the term "split stack". In this way, all of the contexts on the target thread becomes accessible to the handler while it is executing in the handler thread. Prior to returning from the handler to its real calling function, the CTEH system updates the frame pointer in the activation frame to point to that of its real calling function—thus undoing the "Y" shape. In general, the exception is handled in a context in which the exception scope stack and the execution stack are consistent with that of the target thread however that consistency is ensured.

1.5.4 Synchronization

Since a handler thread executes in the context of the target thread, the CTEH system enforces the condition that the target thread does not exit the context associated with a handler before that handler completes. Otherwise, the stack addresses being used by the handler would have undefined content and the results of continued execution would become unpredictable. To ensure that the contexts are available to the handlers, the CTEH system prevents a target thread from exiting the context in which the handler was defined, for as long as there is an handler thread running that can access that context. Because the choice of a handler depends on the state of the exception scope stack, the CTEH system prevents the target thread from exiting any context that would cause the removal from the exception scope stack any scope to which the handler thread is referring. In some embodiment, the CTEH system may prevent the removal of a scope from the exception scope stack while a handler thread is running by, for example, locking the exception scope stack at the start of the handle_exception function and unlocking it before returning. This locking mechanism would also ensure that updates to the exception scope stack are made in a manner that is atomic as viewed by a handler thread. The CTEH system may also use other more sophisticated locking mechanisms such as by locking the activation frame associated with the current scope so that the target thread can continue executing using activation frame higher in the execution stack. When no matching catch-clause is found associated with the current activation frame for the handler thread, the CTEH system would unlock that activation frame and lock the next activation frame on the stack.

2 Implementation

The computing devices on which the CTEH system may be implemented may include a central processing unit, input devices, output devices (e.g., display devices and speakers), storage devices (e.g., memory and disk drives), network interfaces, graphics processing units, and so on. The input devices may include keyboards, pointing devices, touch screens, and so on. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the CTEH system. The data transmission media is media for transmitting data using propagated signals or carrier waves (e.g., electromagnetism) via a wire or wireless connection.

The CTEH system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CTEH system may be implemented in hardware using, for example, an application-specific integrated circuit ("ASIC").

Figure 3:
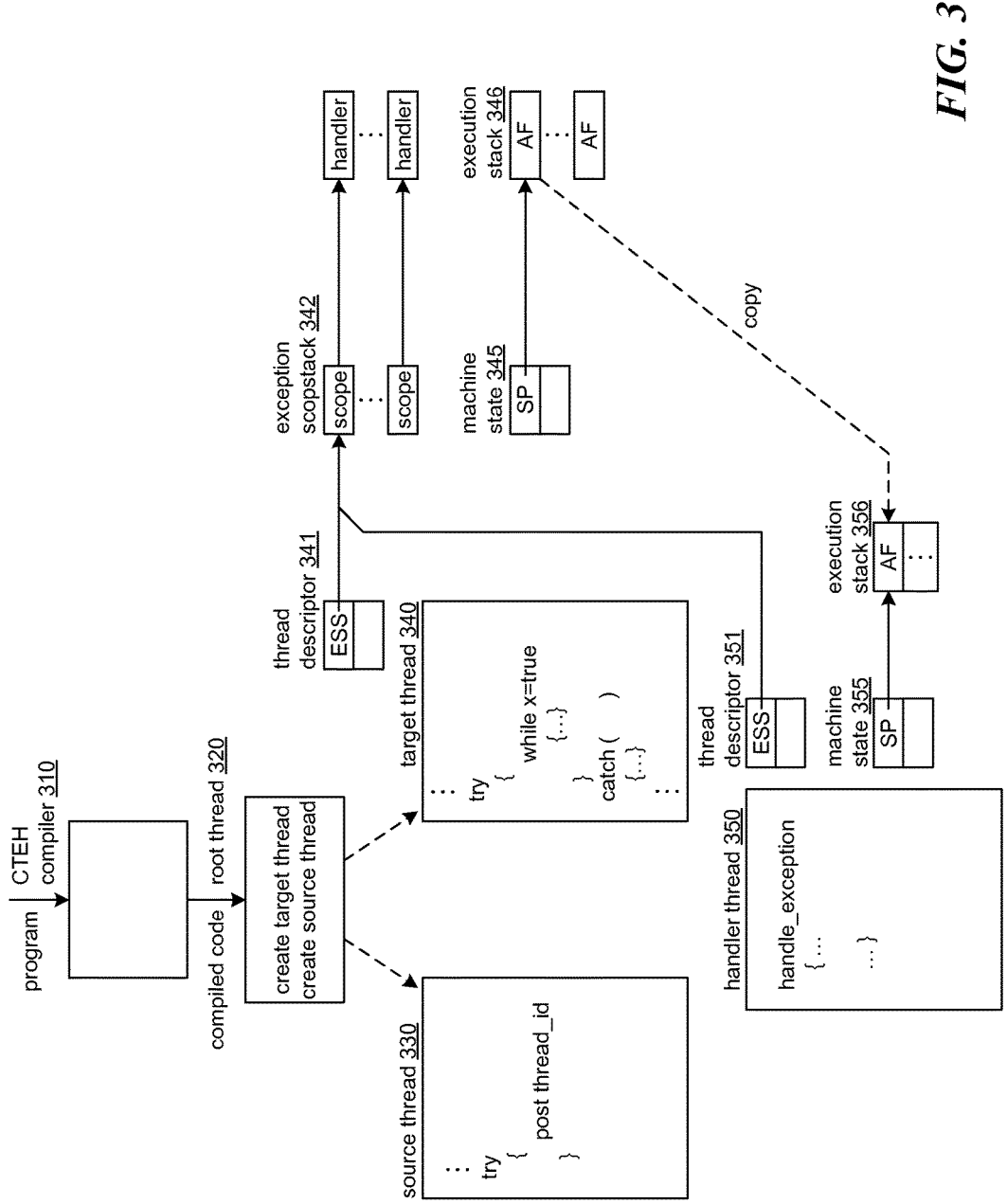
FIG. 3 is a block diagram illustrating the operation of the CTEH system in some embodiments.

FIG. 3 is a block diagram illustrating the operation of the CTEH system in some embodiments. A CTEH compiler 310 inputs a multithreaded program that uses cross-thread exception handling and generates compiled code in accordance with the cross-thread exception handling semantics. When the program is launched, a root thread 320 is created which then creates a source thread 330 and a target thread 340. The target thread may execute a SEH construct with a try-statement executing a loop until some condition is true (e.g., exception handled). The target thread is associated with a thread descriptor 341 that contains an ESS pointer to an exception scope stack 342, which contains scopes pointing to handlers. The target thread is also associated with machine state 345 that includes a stack pointer pointing to execution stack 346, which contains activation frames. The source thread may also execute a SEH construct that includes a throw statement (e.g., post thread-id) that identifies the target thread. When the throw statement is executed by the source thread, the CTEH system creates a handler thread 350 that is initialized to execute a handle_exception function. The handle_exception function sets the thread descriptor of the handler thread to point the exception scope stack 342 of the target thread. The handle_exception function also copies the top activation frame from the execution stack 346 of the target thread to the execution stack 356 of the handler thread. The top activation frame is copied assuming it was the activation frame when the current SEH construct was entered. More generally, each scope may reference its associated activation frame. The handle_exception function then start processing the exception by invoking the handlers identified by the scopes of the exception scope stack until a handler handles the exception. When a handler handles the exception or upon determining that none of the handlers can handle the exception, the handle_exception function returns, which causes the handler thread to terminate. When a scope is encountered that requires a different activation frame, the handle_exception function copies the required activation frame from the execution stack 342 to the execution stack 352. Each scope may include a reference that identifies the associated activation frame.

Figure 4:
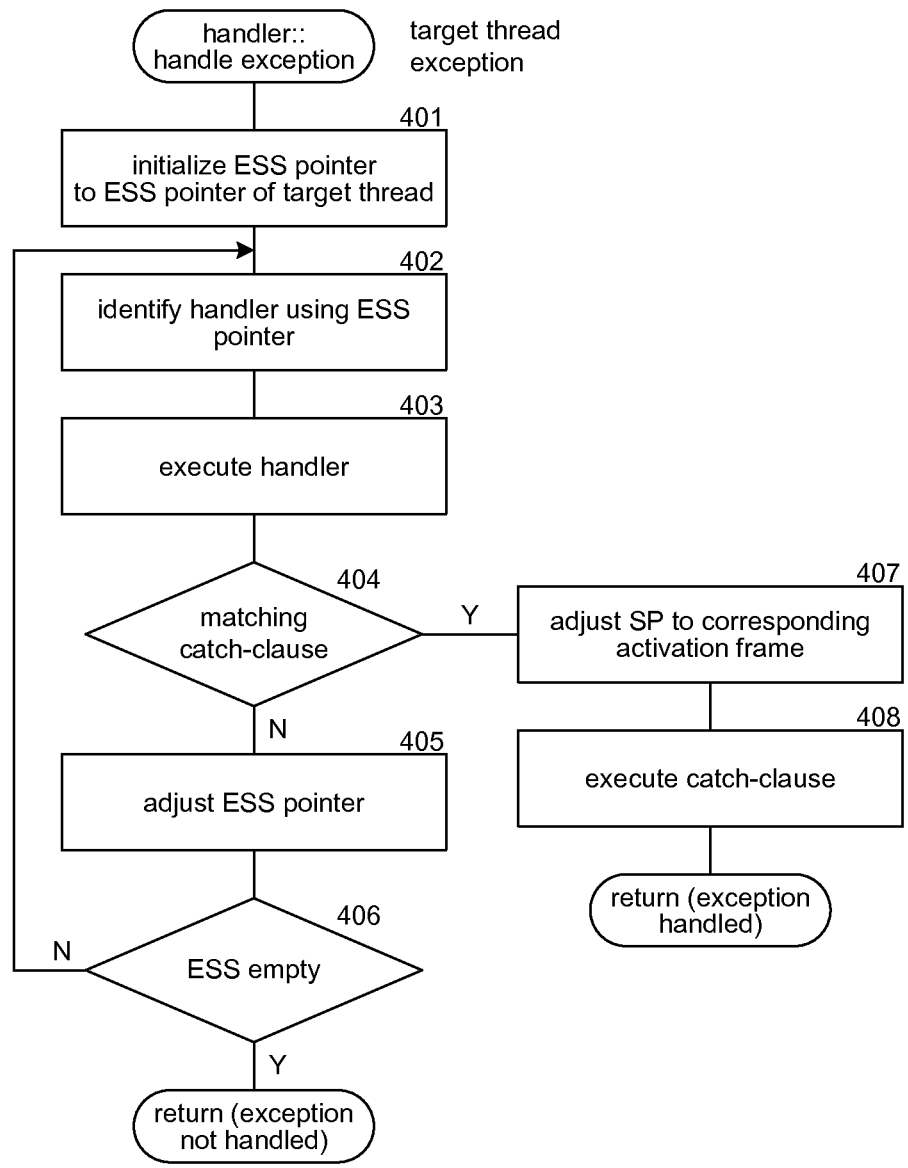
FIG. 4 is a flow diagram that illustrates the processing of a handle exception function in some embodiments.

FIG. 4 is a flow diagram that illustrates the processing of a handle exception function in some embodiments. The handle exception function is passed a thread identifier and an indication of an exception. The indication of the exception may be represented in a variety of data organizations (e.g., "blob") generally referred to as an object. The handle exception function processes the exception in a handler thread that executes in the context of a target thread. In block 401, the component initializes an exception scope stack pointer of the handler thread to point to the exception scope stack of the target thread. In blocks 402-406, the component loops searching for a handler that can handle the exception. In block 402, the component identifies the handler identified by the scope pointed to by the exception scope stack pointer. In block 403, the component executes the identified handler to find a matching catch-clause. In decision block 404, if a matching catch-clause was found, then the component continues at block 407, else the component continues at block 405. In block 405, the component adjusts the exception scope stack pointer to point to the next scope in the stack. In decision block 406, if the exception scope stack is empty, then the component returns an indication that the exception was not handled, else the component loops to block 402 to identify the next handler. In block 407, the component sets the stack pointer to point to the activation frame associated with the scope of the matching catch-clause. In block 408, the component executes the catch-clause and then returns an indication that the exception was handled.

3 Example Applications

The CTEH system may be used to solve well-known problems in the design of multithreaded applications and parallel algorithms. Two well-known problems in parallel processing are how to implement "graceful termination" and how to implement a "eureka". Another problem is function-level coupling in message-passing systems.

3.1 Graceful Termination

The problem of graceful termination is how to ensure that all of the threads implementing a parallel algorithm are collected and their resources released before the application exits. Generally, the operating system ensures that the threads themselves are cleaned up if the application exits unexpectedly, but this does not happen automatically if the algorithm spans several processes. A scheme for graceful termination should work correctly even if the application spans several processes. Another aspect of graceful termination is that faults are not necessarily fatal. For the software to determine this, however, sufficient information about the fault must be delivered to the receiving process to distinguish between fatal and non-fatal errors.

In existing implementations, it is necessary to explicitly install an uncaught exception handler for each thread. That handler might forward information about the exception to the spawning thread or process. But that would lie outside of the normal path for processing exceptions. That is, a complete solution for handling exceptions spanning thread boundaries utilizes two distinct programming models: one provided by the programming language and another provided by run-time libraries. The CTEH system provides a single, unified programming language model.

In some embodiments, the CTEH system takes no special action when an exception remains unhandled after the search has traversed the entire exception scope stack. In an alternate embodiment, the CTEH system could cause a default handler to be installed in the outermost scope of every thread. This handler would cause an unhandled exception in the current thread to be re-posted to the parent thread. In that case, the routine for starting a thread would be the equivalent the example code of Table 12.

TABLE 12

```
typedef void (*usr_thread_fn)(void* args);
void thread_start(user_thread_fn fn, void* args)
{
  try {
    fn(args);
  }
  catch (...)
  {
    post parent;
  }
}
```

The thread identifier parent represents the identifier of the thread that spawned the current thread, which is available via the thread descriptor. In the catch-clause, either post parent; or die parent; can be used since the current thread will terminate promptly anyway. The post parent; statement causes the exception to be delivered asynchronously to the parent thread before the current thread terminates. In that way, information about unhandled exceptions, including exception objects, is preserved while the tree of threads is trimmed. Thus, unhandled exceptions due to different causes can be distinguished by the parent thread.

In some embodiments, the CTEH system implements a similar mechanism to handle exceptions that remain unhandled at the process level. Every process has a distinguished root thread; every thread belonging to the process is spawned directly or indirectly from this root thread. Therefore, an exception which remains unhandled on exit from the root thread is unhandled anywhere in the process. By analogy with the above thread-level uncaught handler, a default handler could be installed in the routine which starts execution of the process as a whole. Because processes do not share address spaces, special handling would be required. The exception cannot simply be re-posted to the parent process. The exception object would have to be serialized and sent to the spawning process in a message, or copied into shared memory accessible by both the spawning and spawned processes. Because the CTEH system preserves the identity of unhandled exceptions up to the process level, the application code in the spawning process can tailor its processing based on the type of unhandled exception.

In an alternate embodiment, the CTEH system includes in the thread identifier of the target thread a sub-field containing a process identifier as well as a thread identifier. As a result, the exact thread in one process that created a second process could be specified as the target of a message indicating that the spawned process terminated with an unhandled exception. In such an embodiment, no special syntax would be required to forward an unhandled exception to a different process as opposed to forwarding it to another thread in the same process. In this way, the CTEH system provide a general scheme for handling unhandled exceptions and providing the information required to do so gracefully can be implemented within a language that comprehends multiple processes as part of its execution model.

3.2 Eurekas

A "eureka" is a term for a parallel processing pattern useful for implementing searches. A number of workers are spawned, each responsible for searching a portion of the search space. Once any one of the workers finds a result, that becomes the overall result of the search. The searches in the remaining workers can then be aborted, thus saving computational resources.

The CTEH system provides a mechanism for implementing such a eureka-based algorithm. The spawning process enters a SEH construct containing a clause that will catch a "result found" exception. It then spawns the workers, keeping a list of their thread identifiers. The spawning thread can then optionally suspend its own execution.

When any of the workers finds a solution, it creates a "result found" "exception" and sends it to its parent. In this case, either post or die can be used. When the spawning thread receives this exception, the value of the result is stored by the body of the catch-clause in some location shared with the spawning thread. Execution of the handler causes the spawning thread to resume if it has been suspended.

Before exiting the body of the try-clause, the spawning thread would then throw special "terminate" exceptions to each of the worker threads using the kill form. As part of the design, an exception of the "terminate" type would not be handled anywhere in the worker thread. Because the "terminate" exception would be unhandled, it would thus cause each worker thread to terminate without performing further processing. On the other hand, since finally-clauses are executed when a thread is terminated, each worker thread cleans up the resources it has allocated before terminating. In some embodiments, a top-level SEH construct could catch this "terminate" exception and forward it to the spawning thread so that the spawning thread receives confirmation that all worker threads have terminated.

3.3 Eliminating Functional Coupling

Many parallel algorithms and their support software are written using active messaging. To process an active message, a new thread is started on a target processor and then runs a named function in that thread (remotely). To support such active messaging, the name of the function needs to be known by the routine sending the message. This knowledge is referred to as function-level coupling. Function-level coupling requires the sender to have detailed knowledge of the name of the function and its arguments. Function-level coupling limits the degree to which objects and polymorphism can be used in dispatching such a message, since the remotely executed function is effectively statically bound.

The CTEH system allows information to be shared between a sender and a receiver, but in a way that is more abstract than the way information is shared with active massaging. With the CTEH system, two processes need only share knowledge of the type of the exception. The sender need only know the name of the type and its inheritance, and detailed knowledge of the members of the object need only be known to a function that uses them. In this way, the sender can treat the type of the exception opaquely (aside from knowledge of its inheritance).

The decoupling of a message handler from the name of the function invoked remotely also provides the recipient of a message more flexibility in how the message is handled. Invoking a function by name implies that certain services are necessarily available in the remote process. Eliminating that assumption allows the receiving process to handle a message in a manner best suited to the resources and services available. This decoupling also simplifies the programming model by encapsulating messages in exception objects so that the names and inheritance hierarchy of the messages can convey their information abstractly.

As illustrated by the eureka and functional coupling examples, the CTEH system can be used to handle "events" generally that arise within a computer program and is not limited to events that are considered "exceptions" or abnormal conditions. Thus, the CTEH system can be used to support message passing between threads and cross-thread event handling. In the description of the CTEH system, the creating of an exception in general can be referred as the creating of an event, exception scope can be referred to as event scope, structured exception handling can be referred to as structured event handling, and so on. For example, the cross-thread exception handling system can be referred to as a cross-thread event handling system. Also, as with use of conventional SEH constructs, die, kill, or post statements can be used outside of an SEH construct. Thus, with cross-thread event handling the source thread need not have an active SEH construct.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, an environment that supports mapping multiple virtual threads (known also as tasks or workers) onto one system thread, the term "thread" in the foregoing should be interpreted as "task" (or "worker") instead. Similarly "thread identifier" should be interpreted as "task identifier" (or "worker identifier"). Examples of virtual threading support software include qthreads (www.cs.sandia.gov/qthreads) and massivethreads (code.google.com/p/massivethreads) Accordingly, the invention is not limited except as by the appended claims.

The invention claimed is:

1. A method performed by a computing system for providing cross-thread event handling for structured event handling, the method comprising:
   under control of a source thread, executing instructions generated based on an event creation statement of a programming language, the event creation statement including a thread identifier of a target thread, the instructions including instructions to start a handler thread to handle the event in a current structured event handling context of the target thread
   wherein the source thread, the target thread, and the handler thread are distinct threads, and
   wherein the source thread provides the thread identifier of the target thread.

2. The method of claim 1 wherein the target thread has a target event scope stack having event handling information from one or more structured events handling constructs and the handler thread has a handler event scope stack, and including setting by the handler thread the handler event scope stack to be consistent with the target event scope stack and performing by the handler thread an event handling action using the event handling information of the handler event scope stack.

3. The method of claim 2 wherein the stacks are per-thread stacks.

4. The method of claim 2 wherein the target thread has a target execution stack having activation frames and the handler thread has a handler execution stack, and further comprising under control of the handler thread, executing instructions to set the handler execution stack to be consistent with the target execution stack and instructions to perform an event handling action using the activation frames of the handler execution stack.

5. The method of claim 1 wherein the target thread has a target execution stack having activation frames and the handler thread has a handler execution stack, and further comprising under control of the handler thread, executing instructions to set the handler execution stack to be consistent with the target execution stack and instructions to perform an event handling action using the activation frames of the handler execution stack.

6. The method of claim 1 wherein execution of instructions of the source thread proceeds in parallel with the handling of the exception by the handler thread.

7. The method of claim 1 wherein the source thread, the target thread, and the handler thread operate asynchronously.

8. The method of claim 1 wherein the event creation statement indicates whether the source thread is to continue execution at a statement after the event creation statement within a structured event construct or at an exit location associated with the structured event construct.

9. The method of claim 1 wherein the source thread terminates after executing instructions generated based on the event creation statement.

10. The method of claim 1 wherein when the source thread terminates while a structured event handling construct is active, executing under control of the source thread instructions to unwind the structured event handling construct.

11. The method of claim 1 wherein a type of the event creation system is determined at runtime.

12. The method of claim 1 wherein the target thread aborts its current execution within a structured event handling construct and continues execution of instructions generated based on an exit statement of a structured event handling construct after the event is handled.

13. The method of claim 12 wherein prior to continuing execution, executing instructions to unwind the context of the target thread to the context of the structured event handling construct in which the event was handled.

14. The method of claim 1 wherein the source thread and the handler thread are mapped to the same system thread.

15. The method of claim 1 wherein the target thread and the handler thread are mapped to the same system thread.

16. A computer-readable storage medium storing computer-executable instructions for controlling a computing system to compile a multithreaded program to support cross-thread structured exception handling, the computer-executable instructions comprising:
   instructions that identify an exception creation statement for creating an exception within a source thread, the exception creation statement specifying a target thread to handle the exception; and
   instructions that generate throw code for the exception creation statement that allocates a handler thread to handle the exception and causes the handler thread to handle the exception in an exception context of a target thread
   wherein the source thread, the target thread, and the handler thread are distinct threads.

17. The computer-readable instructions of claim 16 further comprising instructions that generate code to initialize a per-thread exception scope stack.

18. The computer-readable instructions of claim 16 wherein the throw code causes the handler thread to set an exception context of the handler thread to be consistent with the exception context of the target thread.

19. A computing system for providing cross-thread event handling, the computing system comprising:
- a computer-readable storage medium storing computer-executable instructions that include instructions that under control of a source thread, implement an event creation statement of a programming language that specifies a target thread such that the event is handled in a structured event handling context of the target thread, wherein the source thread and the target thread are distinct threads; and
- a processor that executes the computer-executable instructions stored in the computer-readable storage medium.

20. The computing system of claim 19 wherein the event is handled in a system thread that is selected from the group consisting of the system threads to which the source thread, the target thread, and a separate handler thread are mapped.

21. The computing system of claim 19 wherein the computer-executable instructions further include instructions that under control of the target thread, abort current execution of the target thread within a structured event handling construct and continue execution based on an exit statement of a structured event handling construct after the event is handled.

22. The computing system of claim 21 wherein the computer-executable instructions further include instructions that prior to continuing execution, unwind context of the target thread to the context of the structured event handling construct in which the event was handled.

23. The computing system of claim 19 wherein the event is handled by the target thread.

24. The computing system of claim 19 wherein the event is handled by a handler thread that is distinct from the target thread.

25. The computing system of claim 19 wherein the instructions that implement the event creation statement include instructions that create an object containing a description of the event.

26. The computing system of claim 19 wherein the event is an exception.

27. The computing system of claim 19 wherein the target thread has a per-thread event scope stack.

28. The computing system of claim 19 wherein the event creation statement is within a structured event handling construct and where the computer-executable instructions further include instructions that unwind context associated with the structured event handling construct and terminate the source thread.

29. A computer-readable storage medium storing computer-executable instructions for controlling a computing system to provide structured exception handling within a source thread, the computer-executable instructions comprising:
- instructions that, when an exception creation statement indicates to create an exception with a terminate designation, create the exception, execute any finally clause of a structured exception handling construct, and terminate execution of the source thread; and
- instructions that, when an exception creation statement indicates to create an exception with a continue designation, create the exception and continue execution of the source thread at a statement immediately after the exception creation statement.

30. The computer-readable storage medium of claim 29 wherein the exception is handled in the context of the source thread.

31. The computer-readable storage medium of claim 29 wherein the exception is handled in the context of a target thread.

32. The computer-readable storage medium of claim 29 including instructions that, when an exception creation instruction indicates to create an exception with an abort execution designation, create the exception, suspend current execution of the thread in whose context the exception is to be handled while the exception is being handled, and resume execution of the suspended thread at an exit statement of the structured exception handling construct in which the exception was handled.

33. The computer-readable storage medium of claim 32 wherein the exception is handled in the context of the source thread.

34. The computer-readable storage medium of claim 32 wherein the exception is handled in the context of a target thread.

35. A computer-readable storage medium storing computer-executable instructions for controlling a computing system to support structured exception handling based on a programming language model in a multithreaded environment, by a method comprising during execution of a source thread, creating an exception that specifies a target thread by directing a handler thread to handle the exception in the context of the target thread wherein the source thread, the target thread, and the handler thread are distinct threads of a multithreaded computer program and the handler thread handles the exception by executing instructions specified by the multithreaded computer program for handling the exception.

36. The computer-readable storage medium of claim 35 wherein the method further comprises creating a handler thread and passing an indication of the exception and the target thread to the handler thread.

37. The computer-readable storage medium of claim 35 wherein the source thread and the handler thread are mapped to the same system thread.

38. The computer-readable storage medium of claim 35 wherein the target thread and the handler thread are mapped to the same system thread.

* * * * *